(12) United States Patent
Kousaka et al.

(10) Patent No.: US 9,193,831 B2
(45) Date of Patent: Nov. 24, 2015

(54) URETHANE-BASED OPTICAL COMPONENT AND MANUFACTURING PROCESS THEREFOR

(75) Inventors: Masahisa Kousaka, Tokyo (JP); Yasuhisa Okamoto, Ho Chi Minh (VN)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/239,476

(22) PCT Filed: Aug. 20, 2012

(86) PCT No.: PCT/JP2012/071015
§ 371 (c)(1),
(2), (4) Date: May 12, 2014

(87) PCT Pub. No.: WO2013/027707
PCT Pub. Date: Feb. 28, 2013

(65) Prior Publication Data
US 2014/0243496 A1    Aug. 28, 2014

(30) Foreign Application Priority Data
Aug. 19, 2011    (JP) .................................. 2011-179902

(51) Int. Cl.
| | | |
|---|---|---|
| C08G 75/02 | (2006.01) | |
| C08G 18/76 | (2006.01) | |
| C08G 18/79 | (2006.01) | |
| G02B 1/04 | (2006.01) | |
| C08G 18/38 | (2006.01) | |

(52) U.S. Cl.
CPC ............ *C08G 75/02* (2013.01); *C08G 18/3876* (2013.01); *C08G 18/7621* (2013.01); *C08G 18/7671* (2013.01); *C08G 18/79* (2013.01); *C08G 18/798* (2013.01); *G02B 1/041* (2013.01)

(58) Field of Classification Search
CPC ........... C08G 18/7621; C08G 18/7671; C08G 18/79; C08G 18/798; G02B 1/04
See application file for complete search history.

(56) References Cited

U.S. PATENT DOCUMENTS

| | | |
|---|---|---|
| 2003/0149217 A1 | 8/2003 | Bojkova et al. |
| 2005/0282991 A1 | 12/2005 | Bojkova et al. |
| 2009/0018308 A1 | 1/2009 | Kamura et al. |
| 2009/0104452 A1* | 4/2009 | Bernard et al. ............ 428/423.3 |
| 2010/0075154 A1 | 3/2010 | Hayashi et al. |
| 2010/0292430 A1* | 11/2010 | Ryu et al. .................. 528/60 |

FOREIGN PATENT DOCUMENTS

| | | |
|---|---|---|
| JP | 48-85697 | 11/1973 |
| JP | 3-49903 | 7/1991 |
| JP | 06-037475 | 5/1994 |
| JP | 07-330859 | 12/1995 |
| JP | 08-208794 | 8/1996 |
| JP | 09-012556 | 1/1997 |
| JP | 11-349658 | 12/1999 |
| JP | 2005-509703 | 4/2005 |
| JP | 2008-540817 | 11/2008 |
| JP | 2010-083773 | 4/2010 |
| WO | 2006-123731 | 11/2006 |
| WO | 2010-032365 | 3/2010 |

OTHER PUBLICATIONS

International Search Report issued Nov. 13, 2012, in PCT/JP2012/071015, filed Aug. 20, 2012.
U.S. Appl. No. 14/407,209, filed Dec. 11, 2014, Okamoto, et al.

\* cited by examiner

*Primary Examiner* — Michael L Leonard
(74) *Attorney, Agent, or Firm* — Oblon, McClelland, Maier & Neustadt, L.L.P.

(57) ABSTRACT

The present invention relates to a urethane optical member containing at least one kind of structures represented by the following formulae (1) and (2) in a structure constituting the optical member, and a method for producing the same.

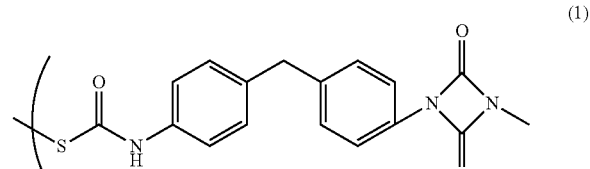

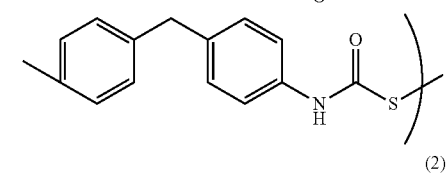

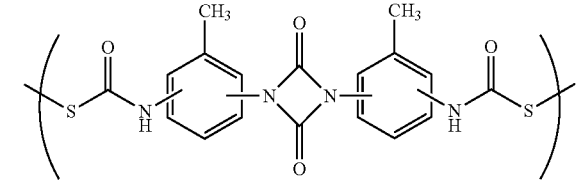

17 Claims, No Drawings

URETHANE-BASED OPTICAL COMPONENT AND MANUFACTURING PROCESS THEREFOR

CROSS REFERENCE TO RELATED APPLICATIONS

The present application is a 35 U.S.C. §371 national stage patent application of International patent application PCT/JP2012/071015, filed on Aug. 20, 2012, published as WO/2013/027707 on Feb. 28, 2013, the text of which is incorporated by reference, and claims the benefit of the filing date of Japanese application no. 2011-179902, filed on Aug. 19, 2011, the text of which is also incorporated by reference.

TECHNICAL FIELD

The present invention relates to a urethane optical member and a method for producing the same. More specifically, the present invention relates to a urethane optical member that has excellent transparency without turbidity or fog and a high refractive index, and a method for producing the same.

BACKGROUND ART

A polythiol compound and a polyisocyanate compound have been commonly used as raw materials of a urethane optical member. An aromatic polyisocyanate compound in the polyisocyanate compound is being produced in large quantities inexpensively and may contribute to enhancement of the refractive index, and thus an aromatic polyisocyanate is preferred as a raw material of a urethane optical member which particularly requires a high refractive index. In particular, 4,4'-diphenylmethane diisocyanate (which may be abbreviated as MDI), and 2,4-tolylene diisocyanate and 2,6-tolylene diisocyanate (which may be abbreviated as TDI) are useful as a raw material monomer of an optical member having a high refractive index from the standpoint that these compounds are easily available industrially and facilitate enhancement of the refractive index.

For example, PTL 1 describes the use of a thiol compound having a particular structure with an aromatic polyisocyanate compound as raw materials for a polymerizable composition used for an optical resin capable of achieving a high refractive index, and 2,4-tolylene diisocyanate and 4,4'-diphenylmethane diisocyanate are used in the examples and comparative examples thereof.

CITATION LIST

Patent Literature

PTL 1 : JP-A-2010-83773

SUMMARY OF INVENTION

Technical Problem

However, MDI and TDI are compounds rich in reactivity and are of such a nature that an oligomer, such as a dimer, thereof is liable to be formed with the lapse of time. Accordingly, in the case where the amount of MDI and TDI added is increased associated with increase of the refractive index desired by an optical member exceeding approximately 1.65, the resulting optical member may have turbidity and fog, which are considered to be formed due to deposition of an MDI dimer and a TDI dimer, and thus a problem of deteriorated transparency may occur.

MDI and TDI are liable to form a dimer as described above, and the amount of MDI and TDI used is preferably small from the standpoint of the transparency of the resulting optical member, but MDI and TDI are necessarily used in at least a certain amount from the standpoint of achievement of a high refractive index. Therefore, it is difficult to achieve both a high refractive index and transparency simultaneously with the use of MDI and TDI. In particular, a plastic lens requiring high-level transparency is demanded to have a high refractive index and excellent transparency, and thus the use of MDI and TDI therein is restricted due to the problem.

In view of the problem, an object of the present invention is to provide a urethane optical member that has excellent transparency without turbidity or fog and a high refractive index even though MDI containing an MDI dimer or TDI containing a TDI dimer is used as a raw material therefor, and to provide a method for producing the same.

Solution to Problem

As a result of earnest investigations made by the present inventors, it has been found that the object may be achieved in such a manner that MDI or TDI and a dimer thereof contained therein are dissolved in a polyisocyanate compound as a raw material, and then reacted with a polythiol compound, whereby the dimer is incorporated into the structure constituting the optical member, and thus the present invention has been completed.

The present invention thus provides urethane optical members and methods for producing the same shown below.

1. A urethane optical member containing at least one kind of structures represented by the following formulae (1) and (2) in a structure constituting the optical member:

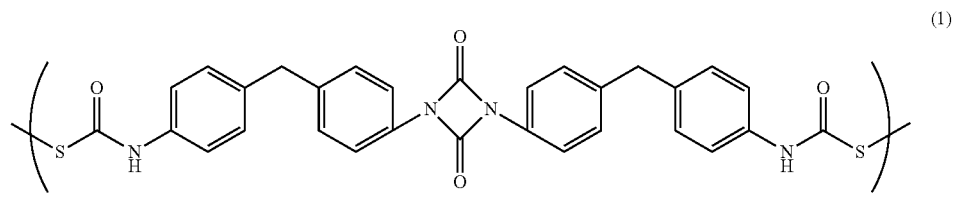

(1)

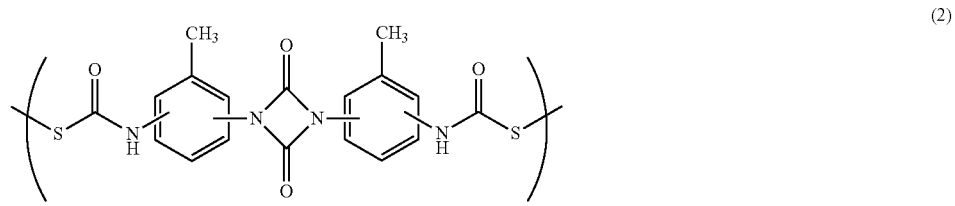

(2)

2. The urethane optical member according to the item 1, wherein the urethane optical member is obtained by polymerization of a monomer composition containing (i) 4,4'-diphenylmethane diisocyanate and a 4,4'-diphenylmethane diisocyanate dimer and/or (ii) tolylene diisocyanate and a tolylene diisocyanate dimer, and a polythiol compound, and a content of the 4,4'-diphenylmethane diisocyanate dimer and/or the tolylene diisocyanate dimer is 0.05% by mass or more of the monomer composition.

3. A method for producing a urethane optical member, containing polymerizing a monomer composition containing (i) 4,4'-diphenylmethane diisocyanate and a 4,4'-diphenylmethane diisocyanate dimer and/or (ii) tolylene diisocyanate and a tolylene diisocyanate dimer, and a polythiol compound, the 4,4'-diphenylmethane diisocyanate dimer and/or the tolylene diisocyanate dimer being reacted with the polythiol compound.

4. The method for producing a urethane optical member according to the item 3, wherein a content ratio of the 4,4'-diphenylmethane diisocyanate dimer in the (i) 4,4'-diphenylmethane diisocyanate and the 4,4'-diphenylmethane diisocyanate dimer is 0.1% by mass or more, and a content ratio of the tolylene diisocyanate dimer in the (ii) tolylene diisocyanate and the tolylene diisocyanate dimer is 0.1% by mass or more.

5. The method for producing a urethane optical member according to the item 3 or 4, wherein the method further contains dissolving the 4,4'-diphenylmethane diisocyanate dimer and/or the tolylene diisocyanate dimer.

Advantageous Effects of Invention

The urethane optical member of the present invention contains an MDI dimer and a TDI dimer in the structure constituting the optical member through a covalent bond, and therefore the urethane optical member thus provided has excellent transparency without turbidity or fog and a high refractive index, which are satisfactory for a plastic lens requiring high-level transparency.

According to the production method of the present invention, an MDI dimer and a TDI dimer are reacted with a polythiol compound used as a raw material monomer, and therefore an urethane optical member that has a high refractive index and excellent transparency may be produced even though MDI and TDI containing dimers thereof are used as a raw material monomer.

DESCRIPTION OF EMBODIMENTS

Urethane Optical Member

The urethane optical member of the present invention contains at least one kind of structures represented by the following formulae (1) and (2) in a structure constituting the optical member.

The structure shown above is derived from an MDI dimer formed in MDI or a TDI dimer formed in TDI (hereinafter the dimers each may be abbreviated as a dimer), and is formed through reaction of the dimer and the polythiol compound, as described later for the production method.

The term, (i) 4,4'-diphenylmethane diisocyanate and the 4,4'-diphenylmethane diisocyanate dimer, referred herein means a mixture of MDI and an MDI dimer, and the MDI dimer in the item (i) in the present specification may be referred to as an MDI dimer in MDI. Similarly, the term, (ii) tolylene diisocyanate and the tolylene diisocyanate dimer, referred herein means a mixture of TDI and a TDI dimer, and the TDI dimer in the item (ii) in the present specification may be referred to as a TDI dimer in TDI.

The TDI dimer in the present invention is at least one kind selected from the six kinds of dimers formed of the 2,4-compound and the 2,6-compound.

By incorporating the dimer formed in TDI or MDI as the aforementioned structure into the structure forming the optical member through a covalent bond, the dimer is prevented from being deposited in the resulting optical member, thereby enhancing the transparency thereof. In addition, it is expected that the refractive index may be further increased by incorporating the structure into the optical member due to the larger molecular weight of the dimer than each monomer thereof, respectively.

Method for Producing Urethane Optical Member

The method for producing a urethane optical member containing the aforementioned structure of the present invention contains polymerizing a monomer composition containing (i) 4,4'-diphenylmethane diisocyanate and a 4,4'-diphenylmethane diisocyanate dimer and/or (ii) tolylene diisocyanate and a tolylene diisocyanate dimer, and a polythiol compound, in which the MDI dimer and/or the TDI dimer is reacted with the polythiol compound. According to the production method of the present invention, the dimer is contained as the aforementioned structure in the optical member by the reaction through a covalent bond, and the resulting optical member may have transparency.

The dimer may be reacted with the polythiol compound in the form contained in MDI or TDI without isolation.

Content of Dimer in MDI or TDI

The dimer is liable to be formed in the monomer with the lapse of time as described above, and therefore in the case where MDI or TDI is used as a raw material monomer, the monomer may contain a certain amount of the dimer depending on the storage condition thereof. According to the production method of the present invention, however, MDI or TDI may be used as the raw material monomer even when the content ratio of the MDI dimer in MDI is 0.1% by mass or

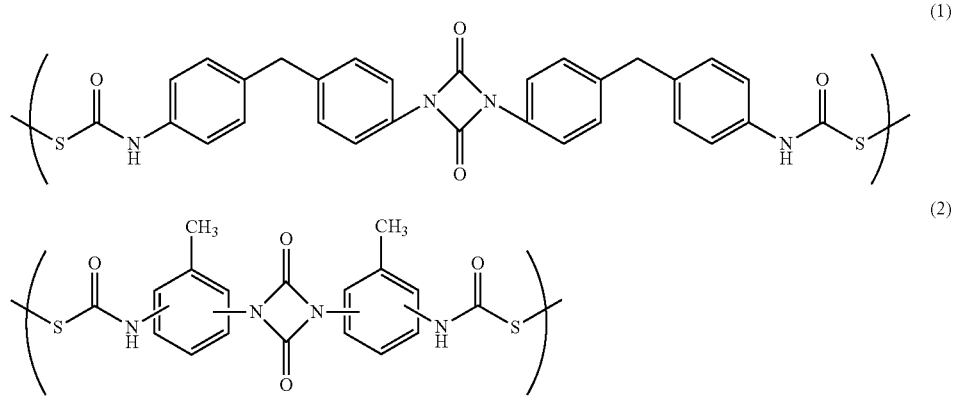

more, and further 0.6% by mass or more, or the content ratio of the TDI dimer in TDI is 0.1% by mass or more, and further 0.6% by mass or more.

The content of the dimer in the monomer is generally approximately from 0.05 to 2.0% by mass while it depends on the storage condition of MDI or TDI and the like. In the case where the content of the dimer is too large, it may be caused that oligomers other than the dimer are formed, MDI or TDI itself is deteriorated, and the like, and it is not preferred to use MDI or TDI as a raw material in such a condition. In the present invention, accordingly, the upper limit of the content of the dimer in MDI or TDI used as the raw material monomer is preferably 3.0% by mass, more preferably 2.5% by mass, and further preferably 0.7% by mass.

Content of Dimer in Monomer Composition

The optical member of the present invention uses, as a raw material monomer, at least MDI containing an MDI dimer and/or TDI containing a TDI dimer, and a polythiol compound, and may be obtained by polymerization of a monomer composition having a content of the MDI dimer and/or the TDI dimer of 0.05% by mass or more. Even when the content of the dimer in the composition is 0.05% by mass or more, and further 0.3% by mass or more, an optical member having excellent transparency may be obtained by the production method of the present invention.

In the case where MDI and TDI are used in combination, the content of the dimer referred herein is the total content of the dimers.

The upper limit of the content of the dimer is preferably 1.5% by mass, more preferably 1.25% by mass, and further preferably 0.35% by mass, with respect to the total amount of preferably 0.35% by mass, with respect to the total amount of the monomer composition, and when the upper limit is 1.5% by mass, the transparency may not be deteriorated due to such factors as deposition of oligomers other than the dimer, thereby achieving both a high refractive index and transparency simultaneously.

The proportion of the dimer with respect to the total amount of the monomer composition is a value calculated from the amount of the dimer in MDI or TDI used and the amount of MDI or TDI used. The content of the dimer in MDI or TDI may be measured by gel permeation chromatography.

Reaction of Dimer and Polythiol Compound

In the reaction of the dimer and the polythiol compound, the dimer in the form of solid has poor reactivity with the polythiol compound, and thus is necessarily reacted with the polythiol compound after dissolving the dimer in the polyisocyanate compound as a raw material. Accordingly, the production method of the present invention preferably contains a step of dissolving the MDI dimer and/or the TDI dimer for reacting the dimer in a dissolved state with the polythiol compound.

The step of dissolving the dimer is not particularly limited as far as the dimer is dissolved thereby, and examples thereof include a method of dissolving the dimer contained in MDI or TDI in another polyisocyanate compound, and a method of dissolving the dimer contained in MDI or TDI under heating, which may not require complicated procedures.

In the method of dissolving the dimer in another polyisocyanate compound, the dimer may be dissolved by mixing MDI or TDI containing the dimer with another polyisocyanate compound, followed by stirring, and for dissolving the dimer completely, the mixture is preferably heated.

While the temperature on heating may vary depending on the content of the dimer in the mixture and may not be determined unconditionally, the temperature is preferably from 50 to 120° C., and more preferably from 70 to 100° C., and the heating time is preferably from 5 to 30 minutes, and more preferably from 5 to 10 minutes, under an inert gas atmosphere, for preventing heat deterioration.

Another polyisocyanate compound, in which the dimer is dissolved, is not particularly limited as far as it is a raw material monomer used, and is preferably a polyisocyanate compound that has good compatibility with the dimer.

Examples of the polyisocyanate compound having good compatibility with the dimer include 1,6-hexamethylene diisocyanate, o-xylylene diisocyanate, m-xylylene diisocyanate, $\alpha,\alpha,\alpha',\alpha'$-tetramethylxylylene diisocyanate, isophorone diisocyanate, bis(isocyanatomethyl)cyclohexane and bis(isocyanatomethyl)dicycloheptane. Among these, 1,6-hexamethylene diisocyanate, o-xylylene diisocyanate and m-xylylene diisocyanate are preferred due to good compatibility thereof.

As the method for dissolving the dimer contained in MDI or TDI under heating, MDI or TDI containing the dimer may be sufficiently heated by such a method as a heating bath.

While the temperature on heating may vary depending on the content of the dimer and may not be determined unconditionally, the temperature is preferably from 50 to 120° C., and more preferably from 70 to 100° C., and the heating time is preferably from 5 to 30 minutes, and more preferably from 5 to 10 minutes, under an inert gas atmosphere, for preventing heat deterioration.

The reaction of the MDI dimer or the TDI dimer with the polythiol compound mainly proceeds in the polymerization process of the monomer composition.

In the case where the urethane optical member is a plastic lens, a mold casting polymerization method is preferably used, in which, for example, a mixture of MDI or TDI containing the dimer, or both of them, and the polythiol compound, another raw material monomer, and additives depending on necessity is cast and polymerized in a mold containing a combination of a glass or metal mold and a resin gasket. The polymerization temperature and the polymerization time in this case may be from 40 to 90° C. for initiating the polymerization and then increased to 110 to 130° C. over a period of from 5 to 10 hours, followed by heating for a period of from 10 to 30 hours for curing and molding, while they may vary depending on the kind of the raw material used.

Raw Material Monomer

The raw material used in the method for producing a urethane optical member of the present invention may include a polyisocyanate compound including MDI and TDI and a polythiol compound, and may also include a polymerizable monomer that is ordinarily used as a raw material monomer for an optical member.

Examples of the polyisocyanate compound include a polyisocyanate compound containing an aromatic ring, an aliphatic polyisocyanate compound and an alicyclic polyisocyanate compound.

Examples of the polyisocyanate compound containing an aromatic ring other than MDI and TDI include 1,3-phenylene diisocyanate, 1,4-phenylene diisocyanate, o-xylylene diisocyanate, m-xylylene diisocyanate, p-xylylene diisocyanate, ethylphenylene diisocyanate, isopropylphenylene diisocyanate, diethylphenylene diisocyanate, diisopropylphenylene diisocyanate, trimethylbenzene triisocyanate, benzene triisocyanate and mesitylene triisocyanate. The polyisocyanate compound having an aromatic ring may be used solely, or two or more kinds thereof may be used.

Examples of the aliphatic polyisocyanate compound include 1,6-hexamethylene diisocyanate, lysine ester triisocyanate and 1,3,6-hexamethylene triisocyanate, and examples of the alicyclic polyisocyanate compound include isophorone diisocyanate, bis(isocyanatomethyl)cyclohexane, dicyclohexylmethane 4,4'-diisocyanate, 1,3-cyclohexane diisocyanate, 1,4-cyclohexane diisocyanate, 1,2-bis(isocyanatomethyl)cyclohexane, 1,3-bis(isocyanatomethyl)cyclohexane, 1,4-bis(isocyanatomethyl)cyclohexane, 1,3,5-tris(isocyanatomethyl)cyclohexane, bicycloheptane triisocyanate and bis(isocyanatomethyl)dicycloheptane. The aliphatic and alicyclic polyisocyanate compounds may be used solely, or two or more kinds thereof may be used.

Examples of the polythiol compound include ethylene glycol bis(2-mercaptoacetate), pentaerythritol tetrakis(2-mercaptoacetate), dipentaerythritol hexakis(2-mercaptoacetate), pentaerythritol tetrakis(3-mercaptopropionate), trimethylolethane tris(2-mercaptoacetate), trimethylolethane tris(3-mercaptopropionate), trimethylolpropane tris(2-mercaptoacetate), trimethylolpropane tris(3-mercaptopropionate), dichloroneopentyl glycol bis(3-mercaptopropionate), dibromoneopentyl glycol bis(3-mercaptopropionate), 2,5-bismercaptomethyl-1,4-dithiane, 4,5-bismercaptomethyl-1,3-dithiane, bis((2-mercaptoethyl)thio)-3-mercaptopropane, bis(mercaptomethyl)-3,6,9-trithiaundecane-1,11-dithiol, 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene, bis(mercaptomethyl)sulfide, bis(mercaptoethyl)sulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 3,4-thiopheneditiol, tetrahydrothiophene-2,5-bismercaptomethyl, 2,5-dimercapto-1,3,4-thiadiazole and 2,5-dimercapto-1,4-dithiane. The polythiol compound may be used solely, or two or more kinds thereof may be used.

Mixing Ratio

The mixing ratio of the polyisocyanate compound containing MDI and an MDI dimer and TDI and a TDI dimer, and the polythiol compound may be generally from 0.5 to 2.0, and preferably from 0.95 to 1.05, in terms of the molar ratio of NCO group/SH group. When the molar ratio of NCO group/SH group is 0.95 or more, substantially no unreacted NCO group may remain, and when the molar ratio is 1.05 or less, the reaction may be completed with substantially no unreacted SH group. An ideal polymer having less unreacted group may be obtained with the range.

In addition to the raw material monomer described above, various additives used in an optical member, such as a polymerization catalyst, a mold releasing agent, an antioxidant, an ultraviolet ray stabilizer and a discoloration preventing agent, may be used depending on necessity.

Examples of the urethane optical member of the present invention thus produced in the aforementioned manner include a plastic lens for spectacles, a camera and the like, a prism, an optical fiber, a substrate for a recording medium used in an optical disk, a magnetic disk and the like, and an optical filter attached to a display device of a word processor and the like.

Particularly preferred examples of the optical member include, due to the excellent transparency without turbidity and fog thereof, a plastic lens, particularly a plastic lens for spectacles requiring an especially high refractive index.

EXAMPLE

The present invention will be described with reference to examples, but the present invention is not limited to the examples.

In Examples and Comparative Examples, the physical properties were evaluated by the following manners.
(1) Appearance A mixture containing raw materials mixed was visually observed immediately before polymerization, and a lens obtained after polymerization was visually observed under fluorescent lamp in a darkroom, thereby evaluating the appearance before polymerization and the appearance, the color and the transparency after polymerization.
Evaluation Standard A: Colorless and transparent with no white turbidity found immediately before and immediately after polymerization B: Substantially colorless and transparent with substantially no white turbidity found immediately before and immediately after polymerization C: Opaque with white turbidity immediately before and immediately after polymerization
(2) Transmittance A visible light luminous transmittance at a wavelength of from 380 to 780 nm was measured with a spectrophotometer, U3410 (produced by Hitachi, Ltd.). The lens thus produced had a thickness of 2.00 mm.
(3) Refractive Index The resulting lens was measured for a refractive index at 25° C. with an e-line with a precision refractometer (KPR-2000) produced by Shimadzu Device Corporation.

Example 1

13.77 g of MDI having a content of an MDI dimer of 2.0% by mass, which was a result of quantitative determination for the oligomer components with gel permeation chromatography (GPC-104, produced by Showa Denko K.K.), was charged in a 100-mL recovery flask and stirred at 85° C. under purging with nitrogen for 5 minutes for dissolving completely.

Then, 0.015 g of butoxyethyl acid phosphate as a mold releasing agent and 0.012 g of dimethyl tin dichloride as a polymerization catalyst were added thereto, 7.44 g of 2,5-bismercaptomethyl-1,4-dithiane (DMMD) and 4.07 g of pentaerythritol tetrakis(2-mercaptoacetate) (PETMA) were mixed therewith, and they were stirred under reduced pressure of 0.13 kPa (1.0 torr) for 2 minutes to prepare a mixture. The mixture was polymerized with a temperature program having an initial temperature of 80° C. and a final temperature of 120° C. over 24 hours to provide a lens. The results of the evaluation of physical properties are shown in Table 1.

Example 2

13.58 g of MDI having a content of an MDI dimer of 0.64% by mass, which was a result of quantitative determination for the oligomer components with gel permeation chromatography (GPC-104, produced by Showa Denko K. K.), was charged in a 100-mL recovery flask and stirred at 50° C. under purging with nitrogen for 5 minutes for dissolving completely.

Then, 0.015 g of butoxyethyl acid phosphate as a mold releasing agent and 0.012 g of dimethyl tin dichloride as a polymerization catalyst were added thereto, 7.44 g of 2,5-bismercaptomethyl-1,4-dithiane (DMMD) and 4.07 g of pentaerythritol tetrakis(2-mercaptoacetate) (PETMA) were mixed therewith, and they were stirred under reduced pressure of 0.13 kPa (1.0 torr) for 2 minutes to prepare a mixture. The mixture was polymerized with a temperature program having an initial temperature of 50° C. and a final temperature of 120° C. over 24 hours to provide a lens. The results of the evaluation of physical properties are shown in Table 1.

Example 3

13.56 g of MDI having a content of an MDI dimer of 0.44% by mass, which was a result of quantitative determination for the oligomer components with gel permeation chromatography (GPC-104, produced by Showa Denko K. K.), was charged in a 100-mL recovery flask and stirred at 50° C. under purging with nitrogen for 5 minutes for dissolving completely.

Then, 0.015 g of butoxyethyl acid phosphate as a mold releasing agent and 0.012 g of dimethyl tin dichloride as a polymerization catalyst were added thereto, 7.44 g of 2,5-bismercaptomethyl-1,4-dithiane (DMMD) and 4.07 g of pentaerythritol tetrakis(2-mercaptoacetate) (PETMA) were mixed therewith, and they were stirred under reduced pressure of 0.13 kPa (1.0 torr) for 2 minutes to prepare a mixture. The mixture was polymerized with a temperature program having an initial temperature of 50° C. and a final temperature of 120° C. over 24 hours to provide a lens. The results of the evaluation of physical properties are shown in Table 1.

Example 4

13.79 g of MDI having a content of an MDI dimer of 2.15% by mass, which was a result of quantitative determination for the oligomer components with gel permeation chromatography (GPC-104, produced by Showa Denko K. K.), was charged in a 100-mL recovery flask and stirred at 90° C. under purging with nitrogen for 5 minutes for dissolving completely.

Then, 0.015 g of butoxyethyl acid phosphate as a mold releasing agent and 0.012 g of dimethyl tin dichloride as a polymerization catalyst were added thereto, 7.44 g of 2,5-bismercaptomethyl-1,4-dithiane (DMMD) and 4.07 g of pentaerythritol tetrakis(2-mercaptoacetate) (PETMA) were mixed therewith, and they were stirred under reduced pressure of 0.13 kPa (1.0 torr) for 2 minutes to prepare a mixture. The mixture was polymerized with a temperature program having an initial temperature of 80° C. and a final temperature of 120° C. over 24 hours to provide a lens. The results of the evaluation of physical properties are shown in Table 1.

Example 5

13.84 g of MDI having a content of an MDI dimer of 2.54% by mass, which was a result of quantitative determination for the oligomer components with gel permeation chromatography (GPC-104, produced by Showa Denko K. K.), was charged in a 100-mL recovery flask and stirred at 90° C. under purging with nitrogen for 5 minutes for dissolving completely.

Then, 0.015 g of butoxyethyl acid phosphate as a mold releasing agent and 0.012 g of dimethyl tin dichloride as a polymerization catalyst were added thereto, 7.44 g of 2,5-bismercaptomethyl-1,4-dithiane (DMMD) and 4.07 g of pentaerythritol tetrakis(2-mercaptoacetate) (PETMA) were mixed therewith, and they were stirred under reduced pressure of 0.13 kPa (1.0 torr) for 2 minutes to prepare a mixture. The mixture was polymerized with a temperature program having an initial temperature of 90° C. and a final temperature of 120° C. over 24 hours to provide a lens. The results of the evaluation of physical properties are shown in Table 1.

Comparative Example 1

13.91 g of MDI having a content of an MDI dimer of 3.0% by mass, which was a result of quantitative determination for the oligomer components with gel permeation chromatography (GPC-104, produced by Showa Denko K. K.), was charged in a 100-mL recovery flask.

While the MDI was in the form of powder without performing the step of dissolving the dimer, 0.015 g of butoxyethyl acid phosphate as a mold releasing agent and 0.012 g of dimethyl tin dichloride as a polymerization catalyst were added thereto, they were stirred at 50° C. under purging with nitrogen for 5 minutes, 7.44 g of 2,5-bismercaptomethyl-1,4-dithiane (DMMD) and 4.07 of pentaerythritol tetrakis(2-mercaptoacetate) (PETMA) were mixed therewith, and they were stirred under reduced pressure of 0.13 kPa (1.0 torr) for 2 minutes to prepare a mixture.

The mixture, which was turbid white, was polymerized with a temperature program having an initial temperature of 50° C. and a final temperature of 120° C. over 24 hours to provide a lens. The results of the evaluation of physical properties are shown in Table 1. The transmittance was not measured, and the refractive index was not able to be measured, due to the white turbidity.

Example 6

13.66 g of MDI having a content of an MDI dimer of 1.2% by mass, which was a result of quantitative determination for the oligomer components with gel permeation chromatography (GPC-104, produced by Showa Denko K. K.), was charged in a 100-mL recovery flask and stirred at 70° C. under purging with nitrogen for 5 minutes for dissolving completely.

Then, 0.015 g of butoxyethyl acid phosphate as a mold releasing agent and 0.012 g of dimethyl tin dichloride as a polymerization catalyst were added thereto, 7.44 g of 2,5-bismercaptomethyl-1,4-dithiane (DMMD) and 4.07 g of pentaerythritol tetrakis(2-mercaptoacetate) (PETMA) were mixed therewith, and they were stirred under reduced pressure of 0.13 kPa (1.0 torr) for 2 minutes to prepare a mixture. The mixture was polymerized with a temperature program having an initial temperature of 70° C. and a final temperature of 120° C. over 24 hours to provide a lens. The results of the evaluation of physical properties are shown in Table 1.

Comparative Example 2

13.66 g of MDI having a content of an MDI dimer of 1.2% by mass, which was a result of quantitative determination for the oligomer components with gel permeation chromatography (GPC-104, produced by Showa Denko K. K.), was charged in a 100-mL recovery flask.

While the MDI was in the form of powder without performing the step of dissolving the dimer, 0.015 g of butoxyethyl acid phosphate as a mold releasing agent and 0.012 g of dimethyl tin dichloride as a polymerization catalyst were added thereto, and they were mixed at 30° C. under purging with nitrogen for 5 minutes. Subsequently, 7.44 g of 2,5-bismercaptomethyl-1,4-dithiane (DMMD) and 4.07 of pentaerythritol tetrakis(2-mercaptoacetate) (PETMA) were mixed therewith.

The mixture contained MDI in the form of powder undissolved, and the liquid thereof was turbid white. The mixture was polymerized with a temperature program having an initial temperature of 50° C. and a final temperature of 120° C. over 24 hours to provide a lens. The results of the evaluation of physical properties are shown in Table 1. The transmittance was not measured, and the refractive index was not able to be measured, due to the white turbidity.

Example 7

6.71 g of MDI having a content of an MDI dimer of 2.0% by mass, which was a result of quantitative determination for the oligomer components with gel permeation chromatography (GPC-104, produced by Showa Denko K. K.), was charged in a 100-mL recovery flask, to which 4.56 g of 1,6-hexamethylene diisocyanate (HDI) was then added, and the mixture was stirred at 70° C. under purging with nitrogen for 5 minutes for dissolving completely.

Then, 0.015 g of butoxyethyl acid phosphate as a mold releasing agent and 0.012 g of dimethyl tin dichloride as a polymerization catalyst were added thereto, 7.44 g of 2,5-bismercaptomethyl-1,4-dithiane (DMMD) and 4.07 g of pentaerythritol tetrakis(2-mercaptoacetate) (PETMA) were mixed therewith, and they were stirred under reduced pressure of 0.13 kPa (1.0 torr) for 2 minutes to prepare a mixture. The mixture was polymerized with a temperature program having an initial temperature of 60° C. and a final temperature of 120° C. over 24 hours to provide a lens. The results of the evaluation of physical properties are shown in Table 1.

Comparative Example 3

6.71 g of MDI having a content of an MDI dimer of 2.0% by mass, which was a result of quantitative determination for the oligomer components with gel permeation chromatography (GPC-104, produced by Showa Denko K. K.), was charged in a 100-mL recovery flask, to which 4.56 g of 1,6-hexamethylene diisocyanate (HDI) was then added. Immediately thereafter without dissolving the dimer, 0.015 g of butoxyethyl acid phosphate as a mold releasing agent and 0.012 g of dimethyl tin dichloride as a polymerization catalyst were added thereto, they were stirred at 30° C. under purging with nitrogen for 3 minutes, 7.44 g of 2,5-bismercaptomethyl-1,4-dithiane (DMMD) and 4.07 g of pentaerythritol tetrakis(2-mercaptoacetate) (PETMA) were mixed therewith.

The mixture contained MDI in the form of solid as similar to Comparative Example 2, and the liquid thereof was turbid white. The mixture was polymerized with a temperature program having an initial temperature of 70° C. and a final temperature of 120° C. over 24 hours to provide a resin. The results of the evaluation of physical properties are shown in Table 1. The transmittance was not measured, and the refractive index was not able to be measured, due to the white turbidity.

TABLE 1

| | | Example 1 | Example 2 | Example 3 | Example 4 | Example 5 | Comparative Example 1 |
|---|---|---|---|---|---|---|---|
| Monomer composition (g) | MDI | 13.77 | 13.58 | 13.56 | 13.79 | 13.84 | 13.91 |
| | HDI | — | — | — | — | — | — |
| | DMMD | 7.44 | 7.44 | 7.44 | 7.44 | 7.44 | 7.44 |
| | PETMA | 4.07 | 4.07 | 4.07 | 4.07 | 4.07 | 4.07 |
| Content of dimer in monomer (% by mass) | | 2.0 | 0.64 | 0.44 | 2.15 | 2.54 | 3.0 |
| Content of dimer in monomer composition (% by mass) | | 1.09 | 0.35 | 0.24 | 1.17 | 1.38 | 1.64 |
| Dissolving condition of dimer | Temperature (° C.) | 85 | 50 | 50 | 90 | 90 | — |
| | Stirring time (min) | 5 | 5 | 5 | 5 | 5 | — |
| Polymerization temperature change (° C.) | | 80 → 120 | 50 → 120 | 50 → 120 | 80 → 120 | 90 → 120 | 50 → 120 |
| Evaluation | Appearance | B | A | A | B | B | C |
| | Transmittance | 87 | 88 | 88 | 87 | 87 | — |
| | Refractive index | 1.669 | 1.667 | 1.667 | 1.669 | 1.669 | — |

| | | Example 6 | Comparative Example 2 | Example 7 | Comparative Example 3 |
|---|---|---|---|---|---|
| Monomer composition (g) | MDI | 13.66 | 13.66 | 6.71 | 6.71 |
| | HDI | — | — | 4.56 | 4.56 |
| | DMMD | 7.44 | 7.44 | 7.44 | 7.44 |
| | PETMA | 4.07 | 4.07 | 4.07 | 4.07 |
| Content of dimer in monomer (% by mass) | | 1.2 | 1.2 | 2.0 | 2.0 |
| Content of dimer in monomer composition (% by mass) | | 0.65 | 0.65 | 0.59 | 0.59 |
| Dissolving condition of dimer | Temperature (° C.) | 70 | — | 70 | — |
| | Stirring time (min) | 5 | — | 5 | — |
| Polymerization temperature change (° C.) | | 70 → 120 | 50 → 120 | 60 → 120 | 70 → 120 |
| Evaluation | Appearance | A | C | A | C |
| | Transmittance | 88 | — | 89 | — |
| | Refractive index | 1.668 | — | 1.641 | — |

It is understood from Table 1 that colorless and transparent lenses are obtained in Examples 1 to 7, and thus the dimer is incorporated as the particular structure into the structure constituting the lens, through reaction with the polythiol compound. It is also understood that in Comparative Examples 1 to 3, the resulting lenses are opaque, and thus the dimer is not reacted with the polyol compound but is deposited as an impurity.

It is further understood from Example 6 and Comparative Example 2, and Example 7 and Comparative Example 3 that a lens having excellent transparency and a high refractive index may be obtained when the dimer is dissolved and reacted with the polyisocyanate compound, even with the same dimer content.

Industrial Applicability

The urethane optical member and the method for producing the same of the present invention provide an optical member that has excellent transparency without turbidity or fog and a high refractive index, and thus are useful in the field of a plastic lens, particularly a plastic lens for spectacles.

The invention claimed is:

1. A urethane optical member comprising at least one structure represented by formulae (1) and (2):

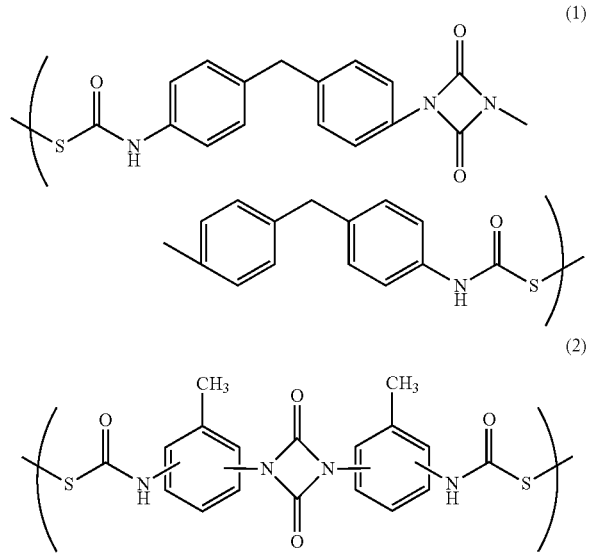

wherein the urethane optical member is obtained by polymerization of a monomer composition comprising:
(i) 4,4'-diphenylmethane diisocyanate and a 4,4'-diphenylmethane diisocyanate dimer and/or (ii) tolylene diisocyanate and a tolylene diisocyanate dimer, and
a polythiol compound,
wherein a content of the 4,4'-diphenylmethane diisocyanate dimer and/or the tolylene diisocyanate dimer is 0.05% by mass or more of the monomer composition.

2. The urethane optical member of claim 1, wherein the content of the 4,4'-diphenylmethane diisocyanate dimer and/or the tolylene diisocyanate dimer is 0.05%-1.5% by mass of the monomer composition.

3. A method for producing a urethane optical member, comprising polymerizing a monomer composition comprising:
(i) 4,4'-diphenylmethane diisocyanate and a 4,4'-diphenylmethane diisocyanate dimer and/or (ii) tolylene diisocyanate and a tolylene diisocyanate dimer, and
a polythiol compound,
by reacting the 4,4'-diphenylmethane diisocyanate dimer and/or the tolylene diisocyanate dimer with the polythiol compound.

4. The method of claim 3, wherein a content ratio of the 4,4'-diphenylmethane diisocyanate dimer in the (i) 4,4'-diphenylmethane diisocyanate and the 4,4'-diphenylmethane diisocyanate dimer is 0.1% by mass or more, and a content ratio of the tolylene diisocyanate dimer in the (ii) tolylene diisocyanate and the tolylene diisocyanate dimer is 0.1% by mass or more.

5. The method of claim 3, wherein the method further comprises dissolving the 4,4'-diphenylmethane diisocyanate dimer and/or the tolylene diisocyanate dimer.

6. The urethane optical member of claim 1, comprising the structure represented by formula (1).

7. The urethane optical member of claim 1, comprising the structure represented by formula (2).

8. The urethane optical member of claim 1, comprising both the structure represented by formula (1) and the structure represented by formula (2).

9. The urethane optical member of claim 1, wherein the monomer composition comprises said 4,4'-diphenylmethane diisocyanate and said 4,4'-diphenylmethane diisocyanate dimer.

10. The urethane optical member of claim 1, wherein the monomer composition comprises said tolylene diisocyanate and said tolylene diisocyanate dimer.

11. The urethane optical member of claim 1, wherein the monomer composition comprises said 4,4'-diphenylmethane diisocyanate dimer, said tolylene diisocyanate and said tolylene diisocyanate dimer.

12. The urethane optical member of claim 1, wherein said urethane optical member is colorless and transparent, and without turbidity and fog.

13. The urethane optical member of claim 1, wherein the content of the 4,4'-diphenylmethane diisocyanate dimer and/or the tolylene diisocyanate dimer is 0.05%-0.35% by mass of the monomer composition.

14. The urethane optical member of claim 9, wherein the 4,4'-diphenylmethane diisocyanate dimer is present in a dissolved state in said monomer composition.

15. The urethane optical member of claim 10, wherein the tolylene diisocyanate dimer is present in a dissolved state in said monomer composition.

16. The urethane optical member of claim 11, wherein both the 4,4'-diphenylmethane diisocyanate dimer and the tolylene diisocyanate dimer are present in a dissolved state in said monomer composition.

17. The urethane optical member of claim 12, wherein said urethane optical member is a spectacle lens.

* * * * *